United States Patent [19]
Leva

[11] Patent Number: 5,470,478
[45] Date of Patent: Nov. 28, 1995

[54] APPARATUS AND METHOD FOR STRIPPING AND ABSORPTION OF VOLATILE MATERIALS

[76] Inventor: Max Leva, 1 Hodgson Ave., Pittsburgh, Pa. 15205

[21] Appl. No.: 272,122

[22] Filed: Jul. 8, 1994

Related U.S. Application Data

[63] Continuation-in-part of Ser. No. 78,914, Jun. 21, 1993, abandoned.

[51] Int. Cl.⁶ ..................................... B01D 11/00
[52] U.S. Cl. .................. 210/634; 210/664; 210/908; 210/175; 210/150; 210/221.2; 210/767; 95/158; 95/159; 96/155; 261/113
[58] Field of Search ................... 210/634, 664, 210/263, 908, 150, 151, 175, 221.2, 767; 95/158, 159; 96/155; 261/114.5, 148, 152, 113

[56] References Cited

U.S. PATENT DOCUMENTS

| | | | |
|---|---|---|---|
| 3,933,953 | 1/1976 | Leva | 261/113 |
| 3,979,192 | 9/1976 | Hibbs et al. | 95/155 |
| 4,048,007 | 9/1977 | Valle-Riestra | 162/57 |
| 4,060,591 | 11/1977 | Garber et al. | 95/158 |
| 4,876,037 | 10/1989 | Leva | 261/113 |
| 4,909,968 | 3/1990 | Leva | 261/113 |
| 5,000,883 | 3/1991 | Leva | 261/97 |
| 5,106,507 | 4/1992 | VonKluck et al. | 210/664 |

FOREIGN PATENT DOCUMENTS

| | | | |
|---|---|---|---|
| 139091 | 12/1978 | Germany . | |
| 278770 | 12/1988 | Germany | 95/158 |
| 85101671 | 4/1985 | WIPO | 95/258 |

*Primary Examiner*—Ana M. Fortuna
*Attorney, Agent, or Firm*—Carothers & Carothers

[57] ABSTRACT

The invention pertains to the removal of volatile organic compounds (VOC), generally speaking from industrial fluids, but with special emphasis on water. The dominant feature of the invention is to resort to physical processes such as stripping, absorption and flash evaporation, so that no environmentally undesirable by-products will be formed. Basically the process achieves in one single tower structure air stripping of the contaminated fluid (water) and subsequent removal of the contaminants from the spent stripping air by controlled and special contacting of the contaminated air with certain low volatility solvents in film tray contacting equipment, which can be used with special advantages to permit removal of the VOC from the spent air, as well as for the recovery of the VOC from the VOC-rich solvents.

27 Claims, 4 Drawing Sheets

APPARATUS AND METHOD FOR STRIPPING AND ABSORPTION OF VOLATILE MATERIALS

This application is a continuation-in-part of application Ser. No. 08/078,914 filed on Jun. 21, 1993, now abandoned.

This invention is broadly concerned with removal and subsequent recovery of volatile materials from liquids.

Whereas the liquids under consideration may be industrial and of involved chemical composition the invention relates particularly, but not exclusively, to water, used industrially or otherwise, that has become contaminated with volatile materials.

Since the invention can conveniently be described by considering systems in which water is the carrier of the volatile materials, the following specification will, for demonstration purposes, lean on the aqueous system, but is should be appreciated that the invention relates to systems in which liquids other than water may be involved.

The volatile materials may either be inorganic or organic. But most often the volatile materials, designated as contaminants are organic compounds. These contaminants, referred to as Volatile Organic Compounds, simply abbreviated as VOC, do therefore in principle not exclude inorganic materials.

Typically VOC contaminants may comprise widely differing complex chemical substances, as exemplified for instance by such a simple material as benzene on one hand, and say polychlorinated and otherwise substituted unsaturated hydrocarbons on the other hand. Often contaminated water does not only contain one discrete contaminant, but the VOCs to be removed may comprise a complex mixture of individual contaminating substances. As far as original concentrations of contaminants in the water are concerned these appear generally quite low, being of the order of magnitude of perhaps 100 to 1000 parts per billion (i.e. ppb), or less. Typically the objective of the decontamination is to reduce such an original VOC content of say 1000 ppb to as low a value as 20 ppb, or even lower.

In many cases removal of most VOCs from water is achievable by ordinary stripping with air (or other inert gases), and using conventional mass transfer towers. Thereafter the resulting contaminated air must for environmental reasons be restored to its original noncontaminated condition before it is discharged into the surrounding atmosphere. Since with the usually large quantities of contaminated water that must be treated, appreciable amounts of contaminants are therefore involved, despite their low initial concentrations in the water, the recovery of the VOC is therefore often justified for reasons of economics as well.

In view of the relatively low VOC concentration in the spent stripping air, the subsequent restoration of the air into its original non-contaminated state is not as simple as it may appear. Thus for implementing this step, rather involved follow-up absorption—distillation—evaporation systems or alternately adsorption and regenerative systems, using activated media such as activated carbon, silica gel or other well known adsorbents must be used. These adsorbents are usually used in small granular form in dual towers, operating in parallel. While one tower is on stream removing the VOC from the spent air the other tower is being regenerated by various means, using steam, reduced pressures and subsequent cooling. In order to permit satisfactory operation of these systems the required diameters of these dual towers must be considerable in order to avoid excessive pressure drops of the spent air, while passing through the beds of granular materials. Thus, as well as for other reasons not mentioned here use of adsorption towers for restoring spent contaminated air to its original conditions is very expensive.

It is therefore significant that wholly unexpectedly and surprisingly the objectives defined above may be implemented by the present invention, with much better efficiency and at much smaller total costs and without creating any follow-up by-products.

According to one aspect of the invention I provide a method of removing a volatile material from a liquid using a vertical tower structure containing a stripping zone wherein liquid containing the volatile material is fed into the top of said stripping zone, an inert gas is introduced to the base of said stripping zone to remove the bulk of said volatile material from said liquid feed, and the tower contains an absorption zone into the base of which said inert gas carrying volatile material is caused to flow. The absorption zone is irrigated at the top with a solvent by which the bulk of said volatile material which was originally in said liquid feed is removed form said inert gas, the cleaned inert gas leaving the top of the absorption zone. The solvent, which now carries the bulk of said volatile material, leaves the base of said absorption zone through a trap and/or pumping means.

Accordingly to a second aspect of the invention I provide apparatus constructed and arranged to perform the method in accordance with the aspect of the invention, given above.

Basic details of a preferred embodiment of the inventive apparatus comprise a section (or sections) designated as stripping zone(s), wherein the contaminated water (called Raw Water) is contacted counter currently with air. This is done in vertical towers, which, for enhanced contacting between the phases, contain a suitable mass transfer or contacting medium. After the bulk of the VOC has been removed from the water and is now in the air, the air carrying the VOC, leaves the stripping zone and enters the base of an absorption zone in which the VOC will now be removed from the air by a process of absorption and in which no follow-up by-product is produced. Whereas absorption zones have in the past been separate from the vessels that carry the stripping zones, according to the invention the absorption zone is an integral part of the vessel that carries the stripping zone, the resulting vessel being hereafter designated as a combination tower.

The choice of contacting medium for the absorption zone and the correct choice of liquid (henceforth designated as "solvent") required for absorbing the VOC from the air does constitute an important critical feature in performing the invention. Thus for efficient implementation of the invention a meaningful coordination of choice of solvent with contacting medium used in the absorption zone is most important.

For best results the solvent required for irrigating the absorption zone should meet certain requirements. Thus the solvent should:

(1) offer a high degree of solubility to the VOC and any components which the VOC may contain, (2) have a substantially lower vapor pressure than that of the VOC or any of its components, (3) not form any azeotropic mixtures with the VOC or with any of its components, (4) not polymerize when exposed to elevated temperatures or when in contact with air or VOC components, (5) not be thixotropic, should not have fouling tendencies, and should not tend to decompose, (6) not combine chemically with the VOC or with any of its components, in order to preclude any follow-up chemical processing for restoration of the solvent to its original condition, as well as for essentially total recovery of the VOC, with all its components, (7) permit regeneration to its original state, either by thermal means, or by application of reduced pressures, or by both means, applied simultaneously.

Solvents which can meet these specifications may be found for example among high-molecular weight hydrocarbons, certain refined lubricating oils, silicone heat transfer media and other similar synthetic substances.

Since the solvents are generally more viscous than the fluids which are normally handled in distillation—absorption—and stripping columns, use of the ordinary devices such as bubble cap, sieve-and valve trays, as well as structured packings cannot be relied upon, on account of only marginal suitability of these devices to handle liquids of elevated viscosities. This inability to perform satisfactorily is principally due to the fact that with these devices no coordinated liquid distribution over the media surfaces created by action of the vapor flow is on hand. It is therefore significant that mass transfer trays are known with a proven record of success in handling such difficult solvents. These mass transfer trays are described in my U.S. Pat. Nos. 4,876,037 and 4,909,968, as well as U.S. Pat. No. 2,212,415 B and 2,215,233 B. The reason why these mass transfer trays are suitable for this severe service is because the structure of the trays and their assembly in towers is such that a meaningful portion of the kinetic energy of the flowing vapor or gas phase is used to distribute the liquid effectively over the mass transfer tray (media) surfaces. This is especially important because the liquid being viscous, would therefore not by itself, unassisted (i.e. without assistance by the vapor or gas flows), spread over the mass transfer tray surface.

Other operational features of the mass transfer trays just introduced, which render them especially effective for the present service are:

(1) their ability to provide very large turn-down ratios, which means to perform well, over appreciable ranges of inert gas flow, at very low irrigation rates, (2) offering much improved HETP-values (Height Equivalent to a Theoretical Plate) as compared to other devices, yielding therefore significantly shorter column heights than other devices, to achieve equivalent mass transfer results, (3) the trays are unobstructed and the assembly precludes metal to metal welding. The trays operate therefore at minimum or very low liquid holdups and steady state operating conditions do result quickly with these trays, (4) the trays contain no moving parts, (5) large diameter unobstructed chimneys, which means low gas or vapor pressure drops, (6) the trays are readily removable from towers for cleaning or other purposes.

It has therefore been found quite surprisingly and totally unexpectedly that the trays referred to in the aforesaid Leva-patents are exceptionally well suited for serving in both the absorption zone as well as in the follow-up VOC-recovery and simultaneous solvent-restoration (referred to henceforth VR-SR) zone.

The VR-SR implementation could of course be done in a separate unit, that would be in addition to and apart from the combination tower that, as this is understood, carries both stripping and absorption sections in one column shell. However for reasons that will become apparent, it may be desirable to integrate the VR-SR step into the combination tower as well. Whereas the VR-SR step may be implemented in a number of ways, such as continuous as well as batch distillation—extraction—or evaporation operations it has been found surprisingly and unexpectedly that when using the mass transfer trays described in the Leva patents cited earlier in these specifications, the VR-SR step may be carried out most effectively by a simple continuous or intermittent flashing operation.

The invention will now be further described by way of example only, with reference to the accompanying schematic drawings, in which.

BRIEF DESCRIPTION OF THE DRAWINGS

DETAILED DESCRIPTION OF THE DRAWINGS

Figure 1:
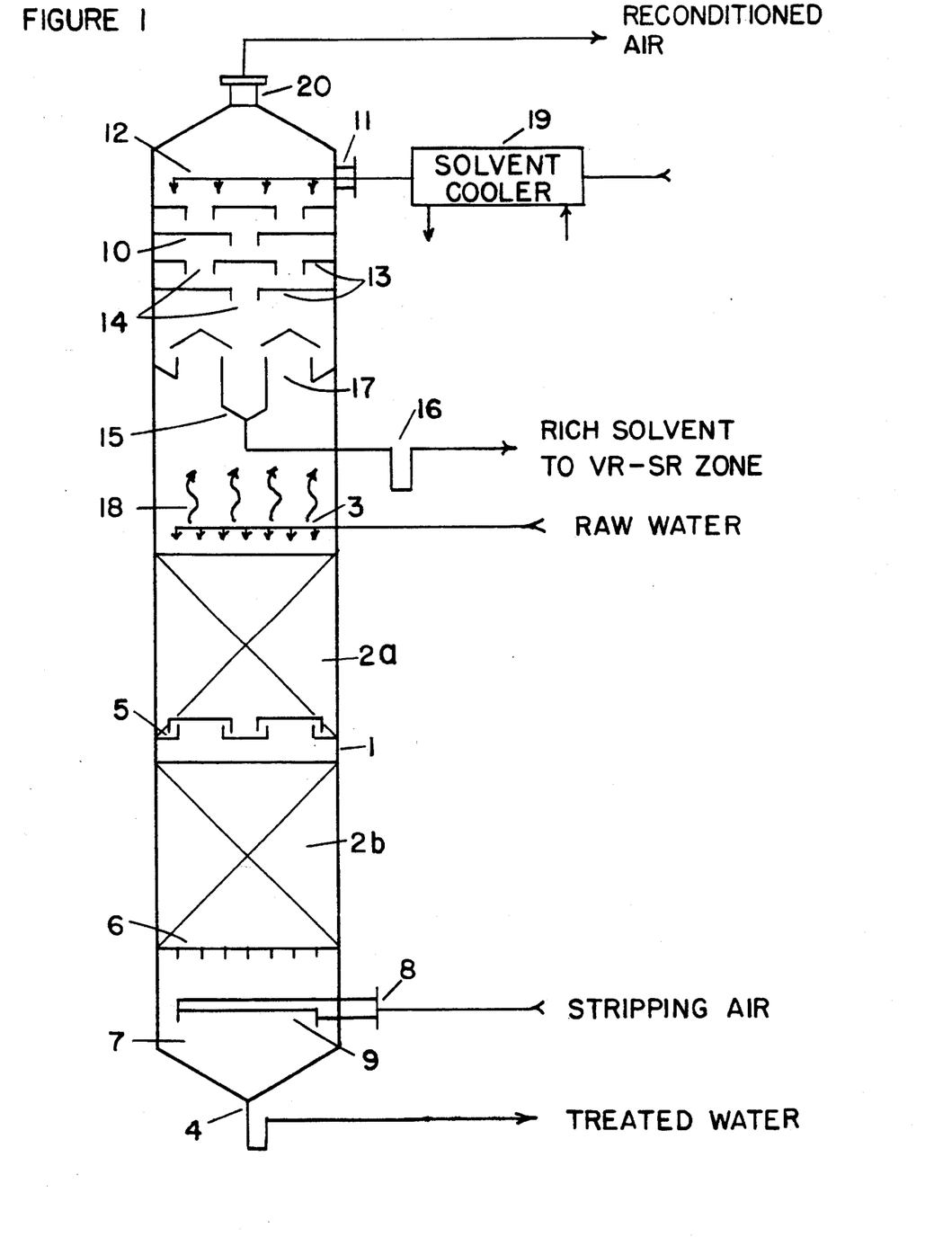
FIG. 1 is a vertical cross-section of a tower structure implementing the present invention.

FIG. 1 shows an implementation of the combination tower, containing both the stripping and absorption zones of the invention. The vertical tower shell is denoted by numeral 1. Below the raw water entry and on top of stripping zone 2a is the raw water distributor 3. The tower comprises two separate stripping zones 2a, and 2b below, and the treated water is leaving the bottom of zone 2b denoted by numeral 4. Whereas the stripping zones may for the intended services be packed with ordinary mass transfer trays of bubble cap-sieve or valve tray designs, as well as others, it is often more convenient and economical to use in the stripping zones randomly dumped packings. In view of the generally high irrigation rates of 5000 pounds per square foot per hour or more, that prevail in the stripping zones, it is advantageous to use tower packings that have been designed for such high irrigation rates, as for instance the packings that are described in my Patent Specification Nos. GB 2,157,189 B, No. DE 3,513,930 and U.S. Pat. No. 5,200,119.

With only moderate needs of VOC removal from the raw water one single stripping zone in a packed tower may suffice. However for more severe requirements of VOC removal two separate stripping zones or even more may be needed. Thus in order to save tower shell height the randomly dumped packing in stripping zone 2a is supported by a combination structure packing support—liquid distribution plate, as is described in my Patent Specification No. U.S. Pat. No. 5,000,883. This is denoted by numeral 5. The use of this combination device is important in all such cases where tower shell height must be saved, as is the case in regard to combination towers referred to here. The packing in the lower stripping zone 2b is supported merely by a pie in packing support plate 6, since the liquid does not require distribution when falling into sump 7.

The stripping zones may be operated with any stripping gas that is practically insoluble in the liquid to be scrubbed. For VOC removal from water, air is the preferred stripping gas, used at essentially atmospheric pressure and normal environmental temperatures. For economy reasons the air rate with the chosen packing should be as low as possible to achieve the desired VOC removal. This must entail an economical packed height and as low a gas pressure drop as possible. The point of air entry into the tower is denoted by numeral 8. A commonly known simple inlet distribution device, denoted by numeral 9 is also indicated. The amount of air required for stripping is normally calculated for case to case applications, and requires a detailed knowledge of process specifications -which are however not the subject of consideration here, suffice it to say, however, that with the proper consideration of all factors involved, air rates can range from as low as 100 or less, to as high as 1000 pounds per square foot of tower cross-section per hour, or higher.

It is now understood that as the stripping air passes upwardly through the stripping zone 2b its VOC content increases steadily. The stripping air carrying now the bulk of the VOC which was originally in the water enters the absorption zone 10. Simultaneously the absorption zone is irrigated with solvent entering the absorption zone 10 at the top, as denoted by numeral 11. It will be noted that before the solvent actually enters the absorption zone 10, it passes through a solvent distributor, denoted by numeral 12.

As mass transfer media chosen for the absorption zone 10 in which intimate contact between solvent and the VOC-laden stripping gas is to be implemented any of the conventional contacting trays, such as bubble cap, sieve or valve tray design may of course be used, as well as any dumped or structured packing. However it has been found that with the strenuous service to be achieved in the absorption zone 10 the mass transfer trays referred to in this specification earlier and described in my cited U.S. and U.K. patents are preferred.

The trays thus chosen for the absorption zone are denoted by numeral 13, and the chimneys depending thereof and in staggered arrangement are shown by numeral 14. It will be noted that the diameter of the chimneys is of the order of magnitude of the tray spacing, ranging from as low as one inch generally or sometimes less, up to six inches and occasionally more. The trays are entirely flat and do on their topside not embody any protrusions or other constructions that would tend to impede lateral spreading of the liquid before discharging downwardly through the chimneys. After having thus passed downwardly through all of the trays the solvent collects in the collecting cone 15, to be discharged to the outside through suitable trap means 16.

The collecting cone 15 is provided with gas risers 17 through which all of the VOC-rich striping gas flows, that is coming out of the top of stripping zone 2a, and as indicated by undulating arrows 18. After passing through gas risers 17 the stripping gas rises upwardly through chimneys 14 and is thus brought into intimate contact with the liquid which, as has already been stated, flows simultaneously downwardly through the same chimneys 14.

In contrast to the stripping zones 2a and 2b the absorption zone 10 operates usually at a rather low irrigation rate, being of an order of magnitude of 100 pounds per square foot of tower cross-section per hour or occasionally lower up to about 1000 pounds per square foot of tower cross-section per hour, or occasionally higher. As already stated the solvent viscosity is generally high and under the prevailing temperatures may range from one centipoise and seldom lower, up to 50 centipoise and occasionally higher. With such severe rheological conditions it would therefore be expected that for proper implementation of the fluid contacting in the absorption zone 10 a rather involved and complex liquid distributor would be needed. In actuality this is however not the case, as the liquid distributor 12 needed for the absorption zone 10 is not as complicated as the liquid distributor 3 for the stripping zone 2a, despite the fact that the service in 2a is much less strenuous than that of the absorption zone. This apparently bizarre situation is however understood when the excellent inherent liquid distribution qualities of the trays in the absorption zone are considered and accounted for.

It is important to visualize the effectiveness of the Leva-patented trays when operated in the absorption as well as the VR-SR zones. Although it would not be feasible to disclose definite mass transfer performance data in view of the great variations in specifications that prevail, it would nevertheless be significant to consider for the most important standards to be met the most likely construction heights of the various zones involved, in comparison to each other. Thus for the stripping zones wherein for this comparison dumped packings shall be considered, and for a stripping ratio (stripping ratio is defined as VOC in entering liquid/VOC in exiting liquid) of 100, a value which is not uncommon, a total of about five mass transfer units would be required. Similarly for the follow-up absorption zone, and using Leva-patented trays in a combination tower an absorption ratio (defined as VOC in entering gas/VOC in exiting gas) of 100 would be acceptable before release of the air to the atmosphere. This would call for about five mass transfer units as well.

With the height of a transfer unit being equal to 4.2 feet for the random packing in the stripping zone the total packed height of the stripping zone would be 4.2×5=21 feet. Next for the trays in the absorption zone their height per transfer unit was experimentally found to be 1.25 feet. This would give a height of the absorption zone of 1.25×5=6.25 feet. This is a significant saving in shell height over what would be achieved with any of the common distillation trays, randomly dumped or structured packings available. The saving in shell height does therefore emphasize the important concept of the combination tower, especially when it is taking advantage of the performance of the Leva-patented trays. The apparently obvious question which will be raised is "Why not use Leva-patented trays also in the stripping zones below, instead of other media"? The answer is that the stripping zones operate at fluid loadings that may not be compatible with the best performance of the absorption zone trays.

As far as the VR-SR zone and use of the Leva-patented trays therein is concerned its effectiveness cannot be defined in terms of the mass transfer unit concept if the VR-SR zone is operated as a flash unit. Nevertheless the conditions of regeneration of the solvent and VOC recovery are much less demanding than the conditions in the absorption zone. In fact it may often not be necessary to remove all of the VOC from the VOC-rich solvent in order to restore the solvent to a satisfactory practical working condition. On the other hand, it was found undesirable, and is therefore explicitly not advocated, to approach in a material way complete saturation of the solvent, or total approach to equilibrium conditions of the solvent, when passing through the absorption zone, as this apparently obvious demand would unreasonably increase the height of the absorption zone, and be all to the detriment of the favorable economics of vessel height which the combination tower offers, when using the Leva-patented trays, referred to earlier.

Other important factors pertinent to operation of the absorption zone pertain to choice of operating pressures and operating temperatures. Whereas operation at essentially atmospheric pressure appears to be most attractive, small to moderate variations thereof could nevertheless be envisioned. As far as temperature is concerned, this should be as low as is practicable. For that purpose the solvent entering the absorption zone passes first through a solvent cooler 19, which will utilize preferably raw water instead of any other coolant. Finally the reconditioned air is being discharged from the absorption zone through nozzle 20.

It has already been said in this writing that the fluid loadings that prevail in the stripping zones may not be compatible with those most desirably chosen for the absorption zone. This is especially pertinent in regard to the inert gas flow used for stripping the raw water. It is therefore a distinct possibility that for such cases the VOC-rich inert gas flow from the top of the stripping zone is in excess of that which could be handled economically by the follow-up absorption zone, which carries the Leva-patented trays. It would therefore be required to enlarge the shell diameter of the absorption zone over that of the lower stripping zone or zones. This would however be a requirement that would be very costly, and therefore undesirable.

Figure 2:
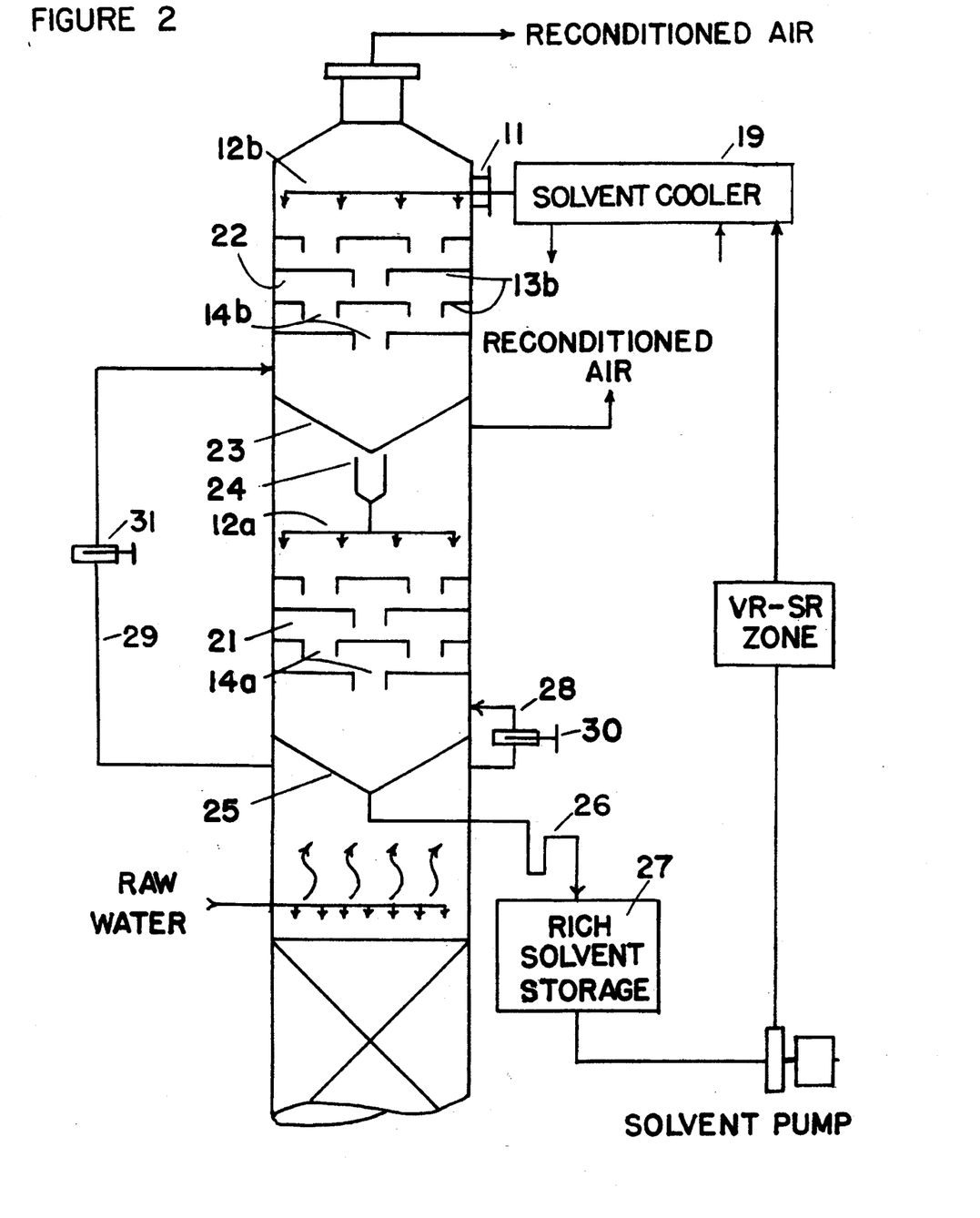
FIG. 2 is another vertical cross-section of a modified tower structure of the present invention.

In order to prevent such an eventuality, the design of combination tower shown in FIG. 1 has been modified and is shown in FIG. 2. With the part of the combination tower below the raw water entry being identical for both FIGS. 1 and 2, the modification pertains to details of the suggested new implementation of the absorption zone shown in FIG. 1.

Instead of presenting one single absorption zone as shown in FIG. 1, FIG. 2 utilizes two absorption sections, operating in series, as far as solvent flow is concerned. Whereas, as has been stated, in this writing before (and as is indicated in FIG. 1), all of the VOC-rich striping gas coming from the top of stripping zone 2a enters the base of the absorption zone through gas risers 17, from the modification of arrangement shown in FIG. 2 if it is seen that the gas quantities to the dual absorption zones comprising two absorption sections may now be manipulated. It is of course understood that the absorption zone provided in FIG. 1 may comprise three or more absorption sections and be within the spirit of the invention.

Gas absorption sections 21 and 22 are, as already pointed out, shown in series arrangement as the as solvent flow only is concerned (and in parallel as far as inert gas flow is concerned only). Thus the solvent leaving the solvent cooler 19, enters the upper gas absorption zone, section 22 at solvent entry port 11, and by means of solvent distributor 12b is administered to the top of the tray stack, made up of Leva-patented trays 13b. As the solvent passes downward through chimneys 14b, the solvent collects in inverted cone 23 and continues to discharge through trap means 24 into solvent distributor 12a, from where it is administered to the top of the lower tray stack in absorption zone 21. Passing through chimneys 14a the solvent collects in inverted cone 25 and is passing through trap means 26 into rich solvent storage reservoir 27.

Simultaneously with the flow of the solvent downwardly through absorption zones 22 and 21 VOC-laden inert gas may be administered through gas by-passes 28 and 29 to absorption zones 21 and 22 respectively. The respective gas admissions into each of the absorption zones may be controlled by manipulation of valving 30 and 31, bearing in mind that the combined flows through valving 30 and 31 must equal the total gas flow 18 that emanates from stripping zone 2a.

Whereas this arrangement shows that the absorption zone shown in FIG. 1 has been replaced by the two absorption zones it is of course understood that if so demanded by process needs three or even more such operating absorption zones may be provided. Although this practice of replacing the original absorption zone shown in FIG. 1 by several (and usually) smaller absorption zones may increase the overall height of the combination tower, any such increase is nevertheless nominal, when viewed in the light of the excellent efficiency and therefore only small heights of the absorption zones, as discussed earlier.

As already stated the arrangement shown in FIG. 2 shows that the gas flow through the two absorption zones 21 and 22 is in parallel, whereas the liquid flow through the two zones is in series.

Figure 3:
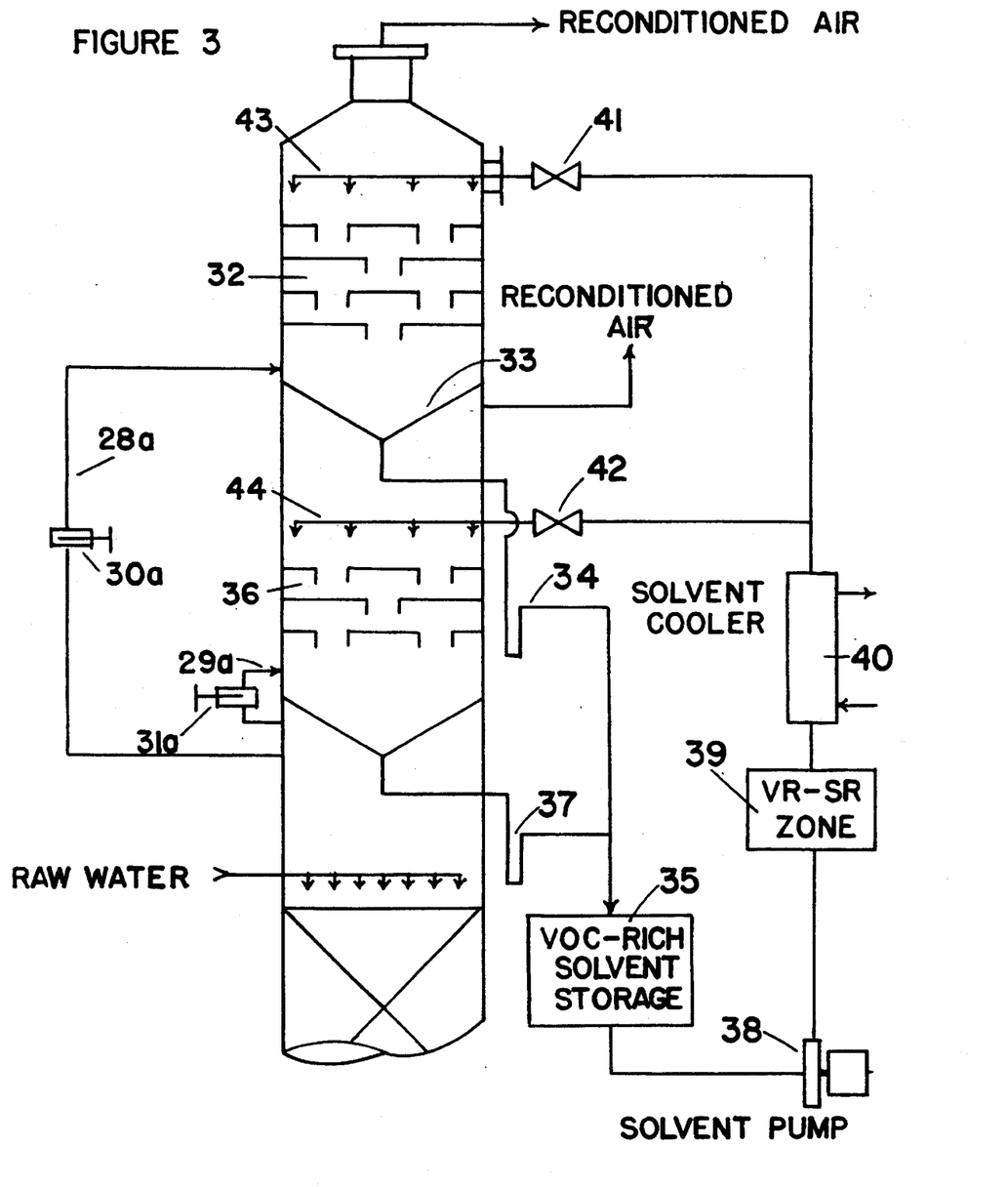
FIG. 3 is another vertical cross-section of a further form of tower structure of the present invention.

FIG. 3 presents another modification wherein both gas as well as liquid flows are in parallel, and where the VOC-rich solvents coming from both absorption zones are restored to their original essentially VOC-free condition.

FIG. 3 is similar to FIG. 2, except that the VOC-rich solvent leaving the upper absorption zone 32 is collected by inverted cone 33 and, going through trap means 34 flows into VOC-rich solvent storage vessel 35. There the effluent from absorption zone 32 is joined by the VOC-rich solvent coming from lower absorption zone 36, after the solvent coming from absorption zone 36 has passed through trap means 37.

The mixed VOC-rich solvent is then pumped by solvent pump 38 through VR-SR zone 39 and solvent cooler 40, and by manipulation of flow control valves 41 and 42 the restored solvent is then admitted to absorption zones 32 and 36, by having been properly distributed to the two absorption zones through solvent distributors 43 and 44.

Simultaneously the VOC-carrying inert gas is admitted to the bottom of absorption zones 32 and 36, through by-passes 28a and 29a, the flows being controlled by valves 30a and 31a.

It will be noted that absorption zone 36 is shown to comprise only three Leva-patented trays whereas in absorption zone 32 four Leva-patented trays have been provided. This distinction is merely to emphasize qualitatively that by proper control of solvent flows, as implemented by valves 41 and 42, liquid flow through the in-parallel arrangement, as shown in FIG. 3, and not being tied to a total saturation requirements of the solvents leaving the absorption zones, provides added flexibility over "in-series liquid flow" operation, as practiced in FIG. 2, thus permitting often a more economical construction than may be offered by in-series flow.

Figure 4:
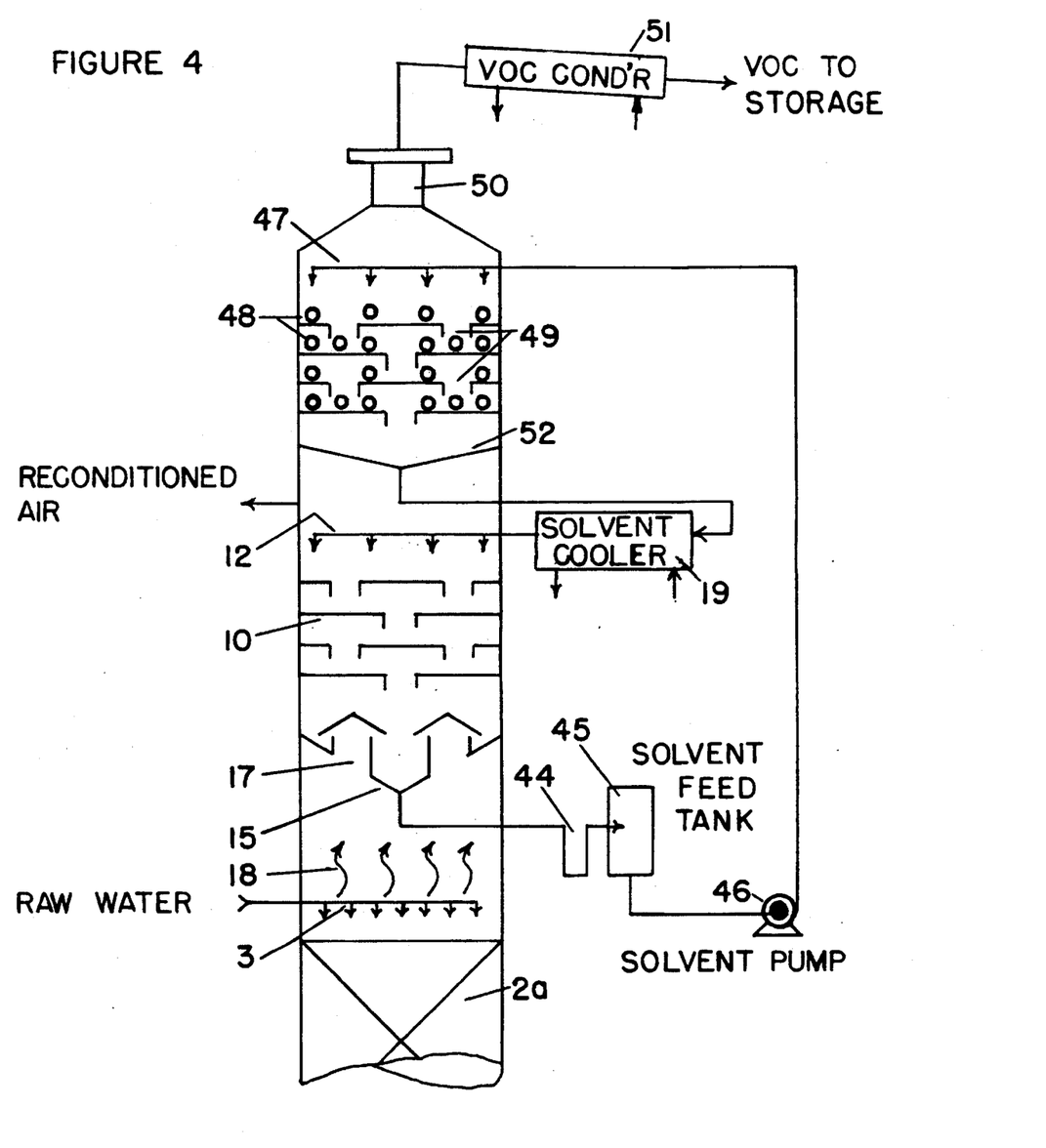
FIG. 4 is still another vertical tower cross-section of a further implementation of the invention.

The solvent may now be restored to a satisfactory practical working condition by using the Leva-patented trays in the VR-SR zone. This may either comprise an auxiliary separate recovery zone or preferably a further addition to the combination tower. This latter arrangement is schematically shown in FIG. 4, where the VR-SR zone has been arranged as another zone onto the upper pan of the combination tower.

The VOC rich solvent passes through trap means 44 into solvent feed tank 45 and is pumped by solvent pump 46 through distributor 47 on to a stack of Leva-patented trays, which at their top side have been provided with heating coils 48. Simultaneously with the entry of the VOC-rich solvent to the tray stack saturated or super heated steam is passing through the heating coils, whence the VOC is vaporized, passing upwardly through the chimneys 49 and leaving the VR-SR zone by way of nozzle 50, to enter the VOC condenser 51. The VOC condenser will of course, as far as this is possible, utilize raw water, to be intended as feed for the stripping zones, thereby improving the stripping process. The treated solvent is leaving the tray stack, collecting in inverted cone 52, to be passed through solvent cooler 19 into distributor 12, to be used for the absorption zone 10. The VR-SR zone as shown is intended to operate at essentially atmospheric pressure. OPeration of the VR-SR zone may of course be implemented also under reduced pressures, which would of course require some additional valving and pressure control items commonly available, but not indicated in FIG. 4. Although this single VR-SR zone unit demonstrates in essence the general requirements, it is envisioned that refinements may be conceived, which would however not alter the generality and validity of this disclosure.

I claim:

1. A method of removing a volatile material from a liquid using a vertical tower structure containing a stripping zone, comprising feeding liquid containing the volatile material to the top of said stripping zone, introducing an inert gas to the base of said stripping zone to remove the bulk of said volatile material from said liquid feed, the tower containing an absorption zone into the base of which said inert gas carrying volatile material is caused to flow, said absorption zone being irrigated at the top with a solvent by which the bulk of said volatile material is removed from said inert gas without said solvent combining chemically with the volatile material or with any of its components in order to preclude any follow-up chemical processing, for substantial recovery and substantial restoration of the solvent to is original condition, removing the cleaned inert gas from the top of said absorption zone, and removing said solvent which now carries the bulk of said volatile material from the base of said absorption zone through a trap and/or pumping means.

2. A method as claimed in claim 1 in which said liquid containing volatile material is water.

3. A method as claimed in claim 2 in which said volatile material is a volatile organic compound.

4. A method as claimed in claim 1 in which removal of said volatile material from said inert gas is accomplished by a process of physical absorption.

5. A method as claimed in claim 1 in which said solvent carrying the bulk of said volatile material leaving the base of said absorption zone is passed through a volatile organic compound (VOC) recovery and solvent restoration zone which is separate from the vertical tower structure and in which the VOC-free composition of the solvent is essentially restored by methods of applying heat and/or reduced pressure.

6. A method as claimed in claim 1 comprising passing said solvent carrying the bulk of said volatile material through a volatile organic compound recovery and solvent restoration zone contained in said vertical tower structure.

7. A method as claimed in claim 5 in which the recovery and restoration zones contain a stack of superimposed, substantially flat, horizontal trays spaced vertically apart so that each carries a thin film of the solvent, the horizontal trays being provided with a plurality of flow apertures distributed substantially uniformly over at least part of the surface of the trays, and the apertures being suitable to permit the thin liquid film on the trays to flow downwardly therethrough from tray to tray and to permit gas to flow upwardly therethrough, heating means being associated with at least some of the trays for boiling the volatile material out of the solvent.

8. A method as claimed in claim 7, in which the flow apertures extend downwardly through respective chimneys that have a diameter in the range of substantially 10 mm to substantially 200 mm.

9. A method as claimed in claim 7 in which the heating means is comprised of pipes substantially surrounding the respective chimney apertures positioned on top of the respective trays, a heat transfer medium passing through the pipes.

10. A method as claimed in claim 1 wherein said solvent irrigating said absorption zone is used at flow rates at which such solvent shall not exit said absorption zone in a condition of saturation in regard to volatile organic compound.

11. A method as claimed in claim 1 in which the absorption zone contains a stack of superimposed, substantially flat, horizontal trays spaced vertically apart so that each carries a thin film of the solvent, the horizontal trays being provided with a plurality of downwardly extending chimneys distributed substantially uniformly over at least part of the surface of the trays, and apertures of said chimneys being suitable to permit thin liquid film on the trays to flow downwardly therethrough from tray to tray and to permit the inert gas carrying volatile material to flow upwardly therethrough from tray to tray.

12. A method as claimed in claim 11 in which the chimneys have a diameter in the range of substantially 10 mm to substantially 200 mm.

13. A method as claimed in claim 1 in which the inert gas is air.

14. A method as claimed in claim 1 in which said absorption zone comprises upper and lower absorption sections, each absorption section being fed into their bases in parallel-flow with a portion of said inert gas carrying a portion of said volatile material stripped from said feeding liquid, and the upper absorption section being fed at its top simultaneously with said solvent, said solvent exiting at the base of said upper absorption section and continuing in in-series flow through the lower absorption section.

15. A method as claimed in claim 14 in which both said inert gas flow and solvent flow are passed through said absorption sections in parallel flow.

16. Apparatus for removing a volatile material from a liquid comprising: a vertical tower structure containing a stripping zone having feeding means for feeding liquid containing the volatile material into the top of said stripping zone and means for introducing an inert gas into the base of said stripping zone to remove the bulk of said volatile material from this liquid feed into said inert gas; the tower also containing an absorption zone having flow means for causing said inert gas carrying volatile material to flow into the base of said absorption zone and including irrigation means at the top of said absorption zone for irrigating said absorption zone with a solvent by which the bulk of said volatile material is removed from said inert gas without creating any follow-up by-products, and further including exhaust means at the top of said absorption zone tier exhausting the cleaned inert gas from the top of said absorption zone, and drain means at the bottom of said absorption zone for draining said solvent carrying the bulk of said volatile material through a trap and/or pumping means connected to said drain means.

17. The apparatus of claim 16, further comprising a recovery zone which is separate from the vertical tower structure for recovery of said volatile material.

18. The apparatus of claim 16, including means for recovering said volatile material by physical absorption in a recovery zone which is contained in said vertical tower structure.

19. The apparatus of claim 18, wherein the recovery zone contains a stack of superimposed, substantially flat, horizontal trays spaced vertically apart so that each carries a thin film of the solvent, the horizontal trays being provided with a plurality of flow apertures distributed substantially uniformly over at least part of the surface of the trays, and the apertures being suitable to permit the thin liquid film on the trays to flow downwardly therethrough from tray to tray and to permit gas to flow upwardly therethrough, heating means being associated with at least some of the trays tier boiling the volatile material out of the solvent.

20. The apparatus of claim 19, wherein the flow apertures extend downwardly through respective chimneys that have a diameter in the range of substantially 10 mm to substantially 200 mm.

21. The apparatus of claim 20 wherein the heating means consists of pipes substantially surrounding the respective chimney apertures and positioned on top of the respective trays and a heat transfer medium passing through the pipes.

22. The apparatus of claim 16, further comprising a recovery zone which is separate from the vertical tower structure and connected thereto to carry the bulk of said volatile material leaving the base of said absorption zone for volatile organic compound recovery in said recovery zone, said recovery zone including means for applying heat and/or reduced pressure before essentially restoring volatile organic compound (VOC)-free composition of the solvent in said restoration zone.

23. The apparatus of claim 16, including means for controlling the flow rates of said solvent irrigating said absorption zone to be sufficiently high so that said solvent does not leave the base of said absorption zone in a condition of saturation in regard to volatile organic compound.

24. The apparatus of claim 16, wherein said absorption zone contains a stack of superimposed, substantially flat, horizontal trays spaced vertically apart so that each carries a thin film of the solvent, the horizontal trays being provided with a plurality of downwardly extending chimneys distributed substantially uniformly over at least part of the surface of the trays, and apertures of said chimneys being suitable to permit the thin liquid film on the trays to flow downwardly therethrough from tray to tray and to permit the inert gas carrying volatile material to flow upwardly therethrough from tray to tray.

25. The apparatus of claim 24, wherein the chimneys have a diameter in the range substantially 10 mm to substantially 200 mm.

26. The apparatus of claim 16, wherein said absorption zone comprises an upper and lower absorption sections, each absorption section being ted into their bases in parallel flow with a portion of said inert gas carrying a portion of said volatile material stripped from said feeding liquid and the upper absorption section being fed at its top simultaneously with said solvent, said solvent exiting at the base of said upper absorption section and continuing in-series flow through the lower absorption section.

27. The apparatus of claim 26, said absorption zone comprising an upper and lower absorption section in which both said inert gas flow and solvent flow pass through said absorption section in parallel flow.

\* \* \* \* \*